US005794195A

United States Patent [19]
Hörmann et al.

[11] Patent Number: 5,794,195
[45] Date of Patent: Aug. 11, 1998

[54] START/END POINT DETECTION FOR WORD RECOGNITION

[75] Inventors: Thomas Hörmann, Grossbottwar; Gregor Rozinaj, Stuttgart, both of Germany

[73] Assignee: Alcatel N.V., Rijswijk, Netherlands

[21] Appl. No.: 854,472

[22] Filed: May 12, 1997

Related U.S. Application Data

[63] Continuation of Ser. No. 462,699, Jun. 5, 1995, abandoned.

[30] Foreign Application Priority Data

Jun. 28, 1994 [DE] Germany .......................... 44 22 545.8

[51] Int. Cl.[6] ....................................................... G10L 9/00
[52] U.S. Cl. ..................... 704/253; 704/233; 704/247; 704/248; 704/252
[58] Field of Search ........................ 704/233, 247, 704/248, 251, 252, 253, 226

[56] References Cited

U.S. PATENT DOCUMENTS

| 4,032,710 | 6/1977 | Martin et al. | 395/2.62 |
| 4,410,763 | 10/1983 | Strawczynski et al. | |
| 4,627,091 | 12/1986 | Fedele | 395/2.42 |
| 4,718,097 | 1/1988 | Uenoyama | |
| 4,920,568 | 4/1990 | Kamiya et al. | 381/46 |
| 4,945,566 | 7/1990 | Mergel et al. | 395/2.62 |
| 5,056,150 | 10/1991 | Yu et al. | 395/2.43 |
| 5,062,137 | 10/1991 | Watanabe et al. | 381/46 |
| 5,241,649 | 8/1993 | Niyada | 395/2 |
| 5,293,588 | 3/1994 | Satoh et al. | 395/2.42 |
| 5,295,225 | 3/1994 | Kane et al. | 395/2.35 |
| 5,305,422 | 4/1994 | Junqua | 395/2.62 |

FOREIGN PATENT DOCUMENTS

| 3422877 | 1/1985 | Germany . |
| 3739681 | 6/1989 | Germany . |
| 8603047 | 5/1986 | WIPO . |

OTHER PUBLICATIONS

W. Reich: "Adaptive Systeme Zur Reduktion Von Umgebungsgerauschen Bei Sprachubertragung" Feb. 11, 1985. Universitat Fredericiana, Fakultat Fur Elektrotechnik Karlsruhe, pp. 76–95, Undated.

Shinichi Sato et al: "Development of the Speaker–Dependent Voice Activated Dialing Equipment", Telecommunications Freedom–Technology on the Move, Philadelphia, Jun. 15–17, 1988.

Nr. Conf. 38, Jun. 15, 1988, Institute of Electrical and Electronics Engineers, pp. 548–554.

"Erkennung und Verarbeitung von gesprochener Sprache mit einfacher Syntax und Semantik fur Informations—und Leitsysteme", K. Kroschel *Institut fur Automation und Robotik*, Nov. 24, 1989, pp. 9–12.

"Adaptive Systeme zur Reduktion von Umgebungsgerauschen bei Sprachubertragung", Dissertation of Werner Reich, Universitat Fridericiana Karlsruhe, Feb. 11, 1985, pp. 76–95.

*Primary Examiner*—Daniel S. Hunter
*Attorney, Agent, or Firm*—Ware, Fressola, Van Der Sluys & Adolphson LLP

[57] ABSTRACT

During speech recognition of words, a precise and strong detection of start/end points of the words must be ensured, even in very noisy surroundings. Use of a feature with noise-resistant properties is shown wherein for a feature vector, a function of the signal energy is formed as the first feature and a function of the quadratic difference of an LPC (Linear-Predictive-Coding) cepstrum coefficient as a second feature. A check quantity or a maximum function of a distribution function is calculated, which detects the start/end points by comparison with a threshold.

15 Claims, 3 Drawing Sheets

START/END POINT DETECTION FOR WORD RECOGNITION

This application is a continuation of application Ser. No. 08/462,699 filed on Jun. 5, 1995 now abandoned.

TECHNICAL FIELD

The invention concerns a method for recognizing both speech and nonspeech intervals for speech recognition. The invention particularly concerns the detection of start points and end points of words during speech recognition.

BACKGROUND OF THE INVENTION

The detection of start points and end points of words is a significant problem for speech recognition and for a high recognition rate, which must be solved. The basis is a start/end point detection, so that the energy can be calculated for a predetermined time interval. If the calculated energy is above an also predetermined threshold, speech, i.e., a word is present. If the energy is below a threshold, a nonspeech interval is present. This comparison of energies thus indicates where the start and the end of a word is located.

However, these methods only work reliably as long as no noise, or only very uniform noise, occurs as background noise. But the threshold must be adjustable if very uniform noise is present. The threshold is raised for uniformly loud background noise, so that nonspeech intervals are not recognized as speech.

However, problems arise precisely in cases where the signal-to-noise ratio is very small, because in those cases the energetic difference between speech and interval is only very small. Due to these problems, "Adaptive Systems to Reduce Ambient Noise during Speech Transmission" were developed, which perform a better speech/interval detection with the use of other features, such as, e.g., the zero passage rate, (from the Werner Reich dissertation: "Adaptive Systems to Reduce Ambient Noise during Speech Transmission", Fredericana University, Karlsruhe, February 1985, p. 76–95).

Furthermore, the state of the art also explains using both the average output and the zero crossing rate to build the feature vectors, then to perform a feature statistic and compare it to a threshold value (Final Report of Integrated Research "Recognition and Processing of Spoken Speech with Simple Syntax and Semantics for Information and Guidance Systems", Chapter 2.2—Interval Detector; Fredericana University, Karlsruhe, Nov. 24, 1989).

Heavy calculations are required to perform both of these methods.

DISCLOSURE OF INVENTION

It is the task of the invention to provide a method for detecting start/end points, which detects the start/end points of words, irrespective of the ambient noise.

According to a first aspect of the invention, detection of the start and end points of words in a signal indicative of speech and, at the same time, a beginning of a nonspeech interval, comprises the steps of dividing the signal indicative of speech into blocks, forming a current feature vector from at least two current features, a first of which is a function of the signal energy, and an at least second of which is a function of the quadratic difference between a linear predictive coding (LPC) cepstrum coefficient of a current block and an average LPC cepstrum coefficient, calculating an average feature vector from a predefined number (I) of blocks containing a nonspeech interval, and updating the average feature vector on the occurrence of each new nonspeech interval, and using the current feature vector and the average feature vector to determine a check quantity (U) which, compared with a threshold value, provides information as to whether a nonspeech interval or word is present, thus detecting the start and end points.

According to a second aspect of the invention, detection of the start and end points of words in a signal indicative of speech comprises the steps of dividing the signal indicative of speech into blocks, forming a current feature vector from at least two current features, a first of which is a function of the signal energy, and an at least second of which is a function of a linear predictive coding cepstrum coefficient, calculating distribution functions by means of the functions of the current features, and determining a maximum function (DMAX) of the distribution function as a measure of whether a nonspeech interval or word occurs between the detected start and end points.

According to a third aspect of the invention, a program module for detecting the start/end points of words in a signal indicative of speech forms a current feature vector for detecting the start/end point and at least a second feature with noise-resistant properties is used for this feature vector.

One advantage of the invention is that with frequently changing ambient noises, but also with constantly equal ambient noises, in which the signal-to-noise ratio is very small, an exact detection of the start/end points, which is necessary for a high word recognition rate, can still take place.

Another advantage is that the method of the invention requires less calculations than the methods used until now, and that the required storage space is significantly smaller. It is an advantage that with a poor signal-to-noise ratio, a higher evaluation of the second feature produces better start/end point detection, thereby increasing the recognition rate even more.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
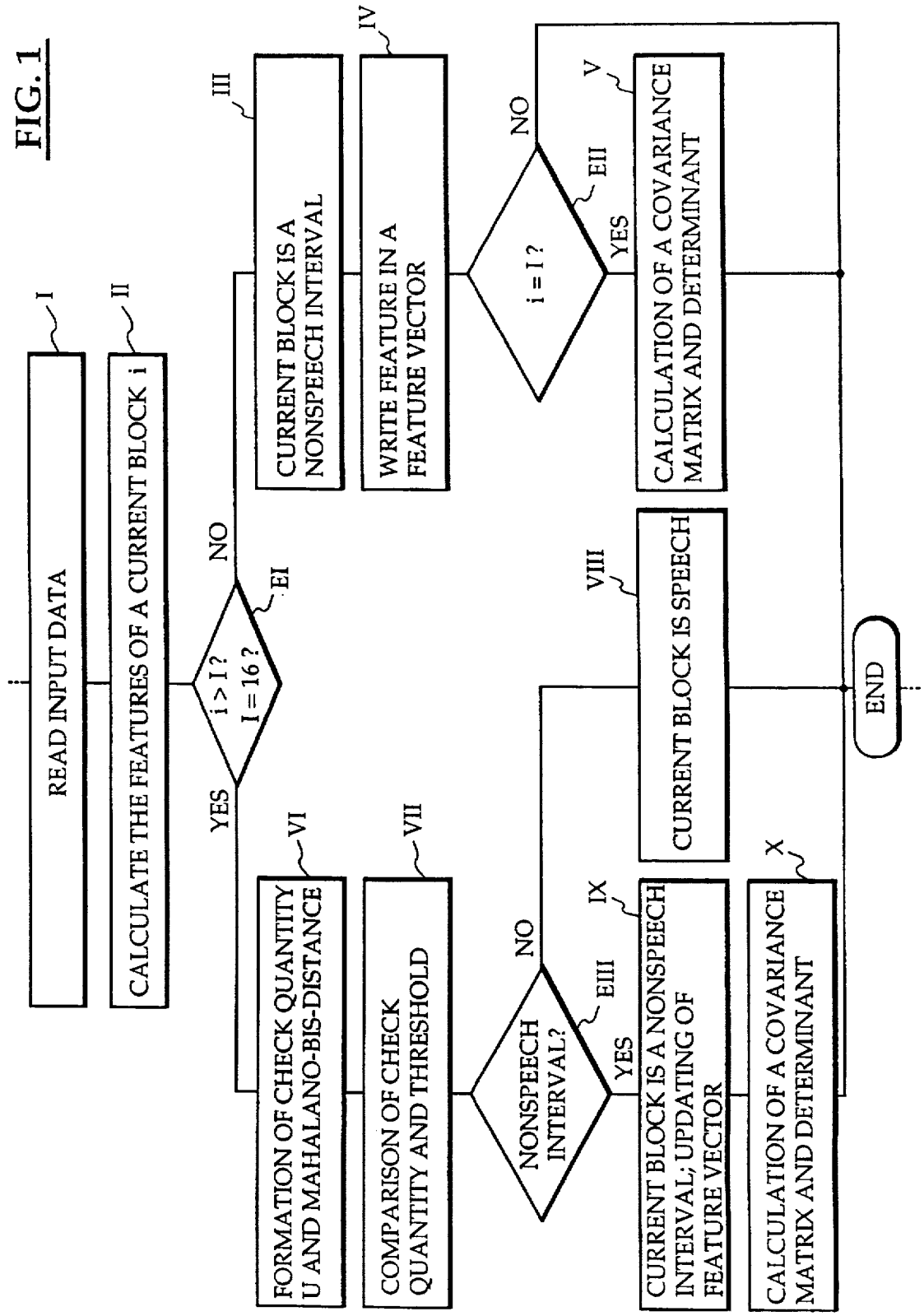
FIG. 1 is a block circuit diagram of a method according to the first aspect of the invention.
Figure 2:
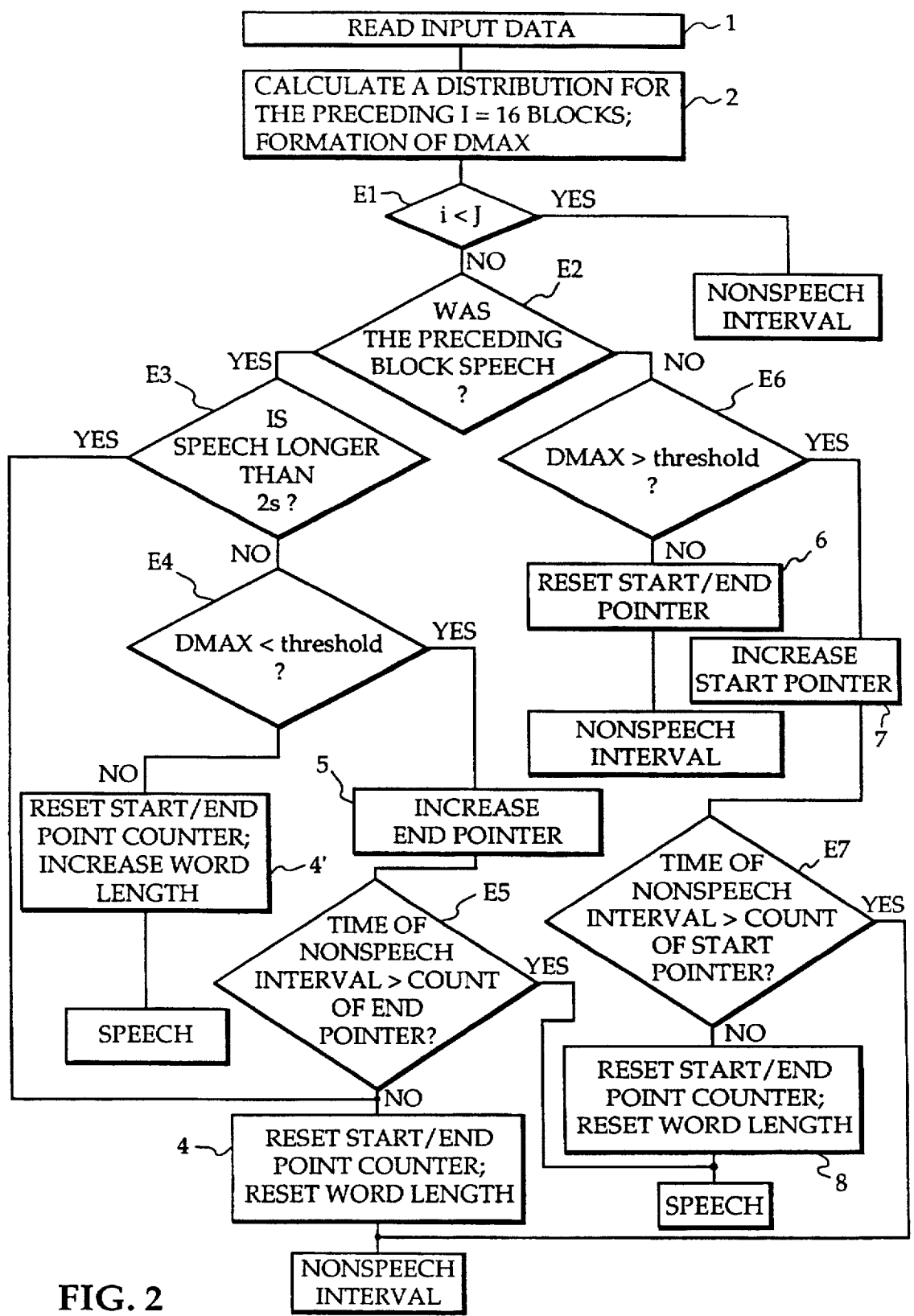
FIG. 2 is a block circuit diagram of a method according to the second aspect of the invention.
Figure 3:
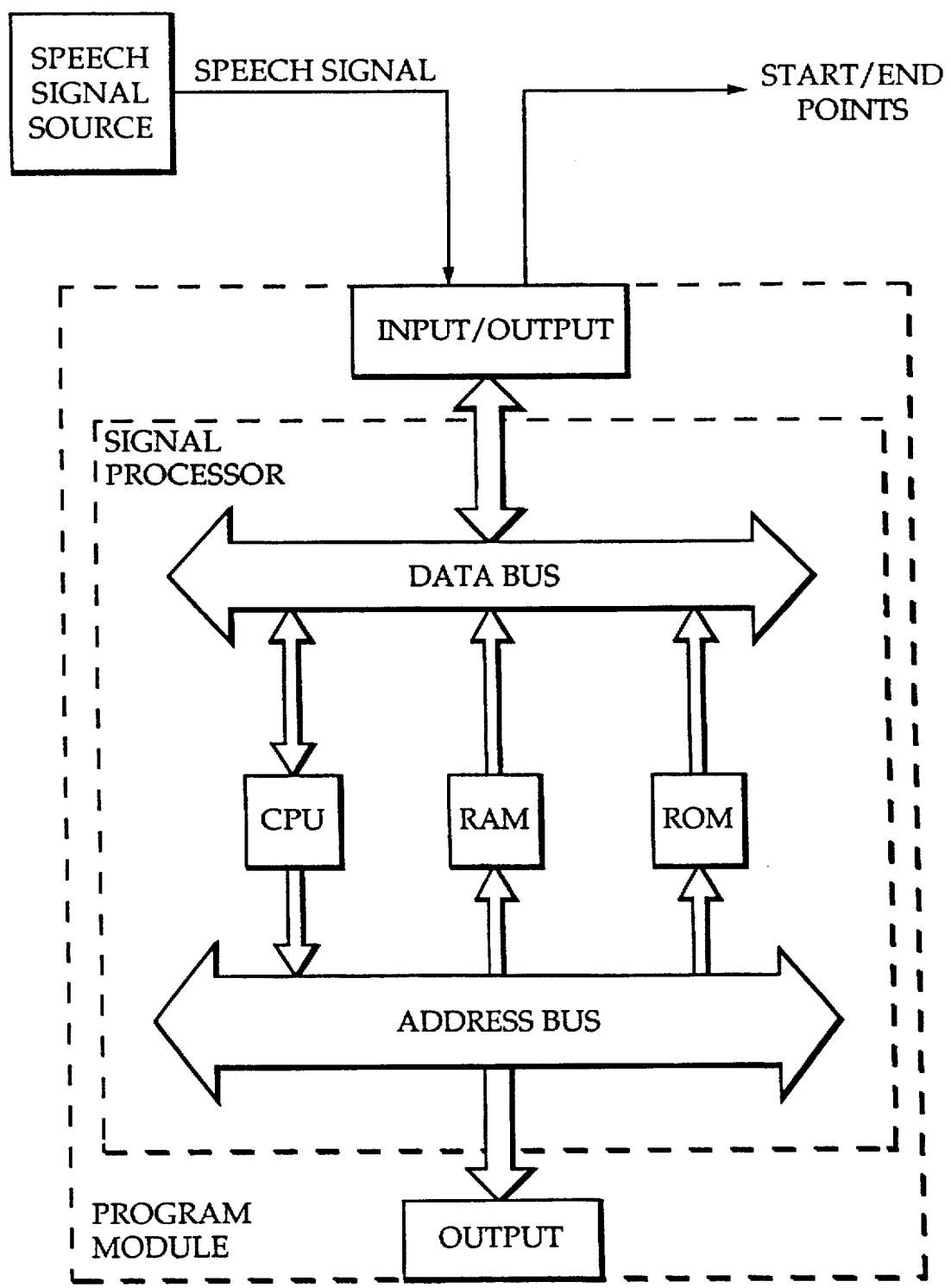
FIG. 3 shows a program module having an input/output port and a signal processor for carrying out the steps of FIGS. 1 and/or 2.

FIGS. 1 and 2 are examples of first and second methods, according to respective first and second aspects of the invention, which may be carried out on a general purpose signal processor in a program module such as shown in FIG. 3. In the examples, a total of N=2 different features determine a feature vector. Of course, N can take on larger values. In these examples, the number of scanning values (L) per block equals one hundred and sixty, i.e., L=160. The number of features (I) placed in a memory equals sixteen, i.e., I=16. The feature vector c for a current block i=0, 1, 2 . . . is:

$$c(i) = \begin{bmatrix} ZCR(i) \\ BMW(i) \end{bmatrix} \quad (1)$$

The feature vector c(i) comprises ZCR(i), which is composed as follows. Preferably K=10 LPC (Linear-Predictive-Coding) cepstrum coefficients are calculated for each block. As shown by experience, in this case the number K=10 is a well suited number, but can be chosen larger as well as smaller. The LPC cepstrum coefficients will now be abbreviated as follows:

$$CEP(n) \text{ where } n=0 \ldots K-1 \text{ with } K=10. \quad (2)$$

The LPC cepstrum coefficients of the latter values determined earlier in time are stored in a memory such as a Random Access Memory (RAM) as shown in the signal processor in FIG. 3. The memory stores, e.g., the H=4 latter values, determined during an interval. Accordingly the result is:

$$CEP(m, n) \text{ where } m=0 \ldots H-1 \text{ with } H=4 \text{ } n=0 \ldots H-1 \text{ with } K=10. \quad (3)$$

An average LPC cepstrum coefficient, which is calculated for an interval signal, can be calculated with the values stored in the above mentioned memory:

$$CEP_{AVER}(n) = \frac{1}{H} \sum_{m=0}^{H-1} CEP(m, n) \quad (4)$$

Accordingly the feature ZCR(i) of feature vector c(i) is calculated as follows:

$$ZCR(i) = \sum_{n=0}^{K-1} |CEP(n, i) - CEP_{AVER}(n)|^2 \quad (5)$$

Thus, feature ZCR(i) of feature vector c(i) is the difference of the LPC cepstrum coefficient of the current block i, when compared to the average LPC cepstrum coefficient, which is then squared. In equation (5):

$$CEP(n, i) \text{ where } i=\text{current block}, n=0 \ldots K-1 \text{ with } K=10. \quad (5a)$$

The second feature BMW(i) of the feature vector c(i) is a function of the signal energy. More precisely said, BMW(i) is the average output and is calculated thus:

$$BMW(i) = \frac{1}{L} \sum_{k=0}^{L-1} bd(k, i) \quad (6)$$

where L=160 and i equals the current block.

The method further calculates an estimated value for the average of features $\hat{mp}$. It is determined as a function of I, which is the number of features stored in the memory, as described earlier. In this case p indicates that it is an interval recognition.

$$\hat{mp} = \frac{1}{I} \sum_{i=0}^{I-1} \underline{c}(i) \quad (7)$$

When solved, it produces:

$$\hat{mp} = \frac{1}{I} \begin{bmatrix} \sum_{i=0}^{I-1} ZCR(i) \\ \sum_{i=0}^{I-1} BMW(i) \end{bmatrix} \quad (8)$$

Variables mw1 and mw2 are introduced as abbreviations, which are used accordingly:

$$\hat{mp} = \begin{bmatrix} mw1 \\ mw2 \end{bmatrix} \quad (9)$$

A covariance matrix $\hat{Sp}$ is formed from these estimated values. The elements of the covariance matrix produce the average quadratic deviation from the average value of the features, and the statistical dependence between the deviations of the features and their average values.

The covariance matrix can be determined as follows, and when solved is:

$$\hat{Sp} = \frac{1}{I-1} \sum_{i=0}^{I-1} (\underline{c}(i) - \hat{mp})(\underline{c}(i) - \hat{mp})^T \quad (10)$$

$$\hat{Sp} = \frac{1}{I-1} \sum_{i=0}^{I-1} \begin{bmatrix} ZCR(i) - mw1 \\ BMW(i) - mw2 \end{bmatrix} |(ZCR(i) - mw1)(BMW(i) - mw2)| \quad (11)$$

Using the introduced variables DIFM1 and DIFM2, we can write:

$$\hat{Sp} = \frac{1}{I-1} \sum_{i=0}^{I-1} \begin{bmatrix} DIFM1 \\ DIFM2 \end{bmatrix} |DIFM1 \quad DIFM2| \quad (12)$$

$$\hat{SP} = \frac{1}{I-1} \sum_{i=0}^{I-1} \begin{bmatrix} DIFM1^2 & (DIFM1 * DIFM2) \\ (DIFM1 * DIFM2) & DIFM2^2 \end{bmatrix}. \quad (13)$$

We now enter the matrix elements $S_{11}$, $S_{12}$, $S_{21}$ and $S_{22}$ which are then solved as:

$$\hat{Sp} = \frac{1}{I-1} \begin{bmatrix} S_{11} & S_{12} \\ S_{21} & S_{22} \end{bmatrix} \quad (14)$$

$$S_{11} = \sum_{i=0}^{I-1} DIFM1^2 = \sum_{i=0}^{I-1} (ZCR(i) - mw1)^2. \quad (15)$$

$$S_{22} = \sum_{i=0}^{I-1} DIFM2^2 = \sum_{i=0}^{I-1} (BMW(i) - mw2)^2 \quad (16)$$

$$S_{12} = \sum_{i=0}^{I-1} DIFM1 \cdot DIFM2 = \quad (17)$$

$$\sum_{i=0}^{I-1} (ZCR(i) - mw1) \cdot (BMW(i) - mw2)$$

$S_{12}=S_{21}$ applies. The inverse covariance matrix $\underline{Sp}^{-1}$ is:

$$\hat{Sp}^{-1} = \frac{I-1}{DET} \begin{bmatrix} S_{22} & -S_{12} \\ -S_{12} & S_{11} \end{bmatrix}, \quad (18)$$

with the determinant DET:

$$DET=S_{22}*S_{11}-[(-S_{12})*(-S_{12})] \quad (19)$$

$$DET=S_{22}*S_{11}-S_{12}^2, \quad (20)$$

thus resulting in:

$$\hat{Sp}^{-1} = \begin{bmatrix} \frac{S_{22}*(I-1)}{DET} & \frac{-S_{12}*(I-1)}{DET} \\ \frac{-S_{12}*(I-1)}{DET} & \frac{S_{11}*(I-1)}{DET} \end{bmatrix} \quad (21)$$

$$\hat{Sp}^{-1} = \frac{I-1}{DET} \begin{bmatrix} S_{22} & -S_{12} \\ -S_{12} & S_{11} \end{bmatrix}. \quad (22)$$

A check quantity U is determined by the preceding calculations, which is a measure of the deviation of the current feature vector c(i) from the average interval value $\hat{mp}$. The Mahalonobis distance must be determined to determine the check quantity U. The result is:

$$U = \frac{I*(I-N)}{N*(I^2-1)} \; [\underline{c}_{(i)} - \hat{\underline{m}}_p]^T * \hat{\underline{S}}_p^{-1} * [\underline{c}(i) - \hat{\underline{m}}_p], \quad (23)$$

where Z=(ZRC(i)−mw1) and P=(BMW(i)−mw2), and:

$$U = \frac{I*(I-N)}{N*(I^2-1)} \; [Z \, P] * \hat{\underline{S}}_p^{-1} * \begin{bmatrix} Z \\ P \end{bmatrix}, \quad (24)$$

$$U = \frac{I*(I-N)}{N*(I^2-1)} \; [Z \, P] \begin{bmatrix} S'_{22}*Z & -(S'_{12}*P) \\ -(S'_{12}*Z) & S'_{11}*P \end{bmatrix}, \quad (25)$$

$$PREF = \frac{I*(I-N)}{N*(I^2-1)} \quad (26)$$

$$U = PREF*(S'_{22}*Z^2 - S'_{12}*P*Z) + (S'_{11}*P^2 - S'_{12}*P*Z), \quad (27)$$

$$U = PREF*[(S'_{22}*Z^2) - (2*S'_{12}*P*Z) + (S'_{11}*P^2)], \quad (28)$$

$$U = \frac{PREF*(I-1)}{DET} \; [(S_{22}*Z^2) - (2*S_{12}*P*Z) + (S_{11}*P^2)]. \quad (29)$$

By comparing it with a predetermined threshold, this check quantity U can be used to determine whether or not speech is present. For example, if the check quantity U is larger than the threshold, it is speech, otherwise it is a nonspeech interval. The threshold was previously adapted by means of the signal energy.

To initialize the interval detector, the first I blocks, in this case I–16, are considered as nonspeech intervals, to establish a base of I=16 feature vectors for the feature statistics. The actual start/end point detection begins with the following block.

For the chosen instance of I=16 blocks and a block length of 20 ms, the initialization lasts 0.32 seconds.

The previously calculated check quantity U is determined for the entire Mahalonobis distance, which represents the following portion of the check quantity:

$$[\underline{c}_{(i)} - \hat{\underline{m}}_p]^T * \hat{\underline{S}}_p^{-1} * [\underline{c}_{(i)} - \hat{\underline{m}}_p]. \quad (30)$$

This Mahalonobis distance is used for comparison with a threshold between speech and a nonspeech interval.

In the following, the method according to claim 6 will be explained in more detail by means of a configuration example.

In the present configuration example as well, an input signal is divided into blocks of 20 ms length for example. Inside a block, for example L=160 scanning values are determined. Preferably K=10 LPC (Linear-Predictive-Coding) cepstrum coefficients are calculated for each block. The value of K=10 should not represent any limitation, since a value larger or smaller than 10 can also be chosen. The LPC cepstrum coefficients are identified in the following by CEP(k,i), where k=0, 1=K−1, and i indicates the sequential block number.

To detect the start/end point for the word recognition, a current feature vector of at least two features is formed. A first current feature is a function of the signal energy and is determined by:

$$MV(i) = \frac{1}{L} \sum_{n=0}^{L-1} |PCM(i, n)|, \quad (31)$$

where PCM(n) are the Pulse-Code-Modulated data of an input signal.

Both features, MV(m) as well as CEP (k,i), are very similar when the present block contains a nonspeech interval. But both features should be significantly different, so that a second feature at least can produce an improvement in the start/end point detection, thereby also leading to a high word recognition rate. The following process serves this purpose.

The CEPs (k, 0) and MVs (0) values are determined for the first block with order number i=0. The CEPs (k, i) value for the next block is calculated as follows:

$$CEPs(k, i) = \frac{3}{4} \; CEPs(k, i-1) + \frac{1}{4} \; CEPs(k, i). \quad (32)$$

The following cepstral difference results for each current block i:

$$CD(i) = \sum_{K=0}^{K-1} |CEP(k, i) - CEPs(k, i)|^2. \quad (33)$$

N=16 cepstral differences of the last remaining blocks are stored in a memory. The last N=16 energy values MV(i) are also stored in this memory.

Thus, N=16 blocks are needed to initialize the start/end point detector. The system is able to perform a start/end point detection for each subsequent current block.

An average cepstral distance CD(i) is averaged for all N=16 cepstral distances:

$$CD_L(i) = \frac{1}{N} \sum_{n=0}^{N-1} CD(i-n). \quad (34)$$

This results in the distribution ΔCD(i) of the last N=16 cepstral distances:

$$\Delta CD(i) = \frac{1}{N-1} \sum_{n=0}^{N-1} [CD(i-n) - CD_L(i)]^2. \quad (35)$$

The energy difference results from:

$$\Delta MV(i) = \frac{1}{N-1} \sum_{n=0}^{N-1} [MV(i-n) - MV_L(i)]^2, \quad (36)$$

from which also an average energy difference, formed by the last N=16 blocks results in the following manner:

$$MV_L(i) = \frac{1}{N} \sum_{n=0}^{N-1} MV(i-n). \quad (37)$$

The result is the following: the distribution functions ΔMV(i) and ΔCD(i) are very small for an almost constant signal, particularly in the case where a nonspeech interval occurs. The distribution functions produce a larger value for speech. The result is the formation of a maximum function:

$$DMAX(i) = max \; \{\Delta CD(i), \Delta MV(i)\} \quad (38).$$

The following case difference can be undertaken: if ΔDMAX(i) is larger than a predetermined value, the detected signal is speech. Below that value, the detected signal is a nonspeech interval.

When using this method, it was shown that even with the occurrence of differently loud and changing background noises, although both distribution values increase, they soon settle again to a lower value.

In the following, a configuration example according to claim 1 is explained by means of FIG. 1. The steps of FIG. 1 can be stored as a series of instructions in a read only memory (ROM) as shown in FIG. 3 for execution by a central processing unit (CPU) in conjunction with the RAM. It is assumed that the number of features for the feature vector is N=2, that the number of scanning values is L=160, and that the number of values stored in a memory is I=16. It is also assumed that the present speech signal is divided into blocks. The input data are read in a first step I, thus the LPC cepstrum coefficients of a current block are read and the scanning values of the signal energy are read. In a second step II, the features of a current block i are calculated, which in this configuration example are the cepstral distance and the average value. A first decision element EI determines whether the sequential number of a current block i is larger than I. In this case I corresponds to I=16.

In the event i is not larger than I, and the decision by EI is also no, the following path is taken to initialize the feature memory. A third step III determines that the current block i represents a nonspeech interval. The features are written into a feature memory such as the RAM of FIG. 3 in a fourth step IV. A subsequent second decision element EII determines whether the current block i equals I. In the event that i does not equal I, and the decision by EII is no, a first sequence ends with END and the sequence can again start with step I for the next block. In the event the current block i equals I, a covariance matrix and its determinant are calculated in a fifth step V. This is also followed by the end END of a first sequence.

In the event the first decision element EI finds the current block i to be larger than I and the decision by EI is yes, a check quantity U is formed in a sixth step VI by calculating a Mahalonobis distance. In a seventh step VII, the check quantity U is compared to a threshold to determine whether a speech or a nonspeech interval is present. A third decision element EIII determines whether or not a nonspeech interval is present. In the event that no nonspeech interval is present, thus the decision is no, an eighth step VIII notes that speech is present in the current block.

This also ends the sequence with END. In the event a nonspeech interval is present in the third decision element EIII, thus the decision is yes, a ninth step IX notes that a nonspeech interval is present. The average feature vector is updated with the aid of the current feature vector. A covariance matrix and its determinant are calculated in a tenth step X. This also ends the sequence with END.

In the following, a method for detecting the start/end point for the word recognition is explained in detail by means of FIG. 2. It should be understood that this method also can be carried out by the signal processing within the program module of FIG. 3.

The data from the input signals are read in a first step 1. In this case, these could be LPC cepstrum coefficients and the average signal energy of a current block, for example. In a second step 2, both a distribution of the LPC cepstrum coefficients as well as a distribution of the signal energy are calculated for the last 16 blocks respectively. In addition, a maximum function DMAX is formed, which is composed of the maximum LPC cepstrum distribution function and the average signal energy distribution function. A subsequent first decision element E1 determines whether the current block is one of the first 16 blocks. In case of a positive decision, namely yes, a third step 3 determines that the last block represents a nonspeech interval. In the event of a negative decision, namely no, a second decision element E2 determines whether the preceding block was speech. In the event speech was present in the last block, a third decision element E3 determines if the speech was longer than 2 seconds. In the event of a positive decision, a counter, which adds up the number of detected end points, is reset during a fourth step 4. A counter which adds up the number of detected start points is also reset. In the same way, a counter that indicates the word length is reset. The subsequent decision is that the current block represents a nonspeech interval.

In the event of a negative decision by the third decision element E3, a fourth decision element E4 determines if the maximum function DMAX is smaller than a threshold. In the event the maximum function DMAX is not smaller than a threshold, it is decided that speech is present in the current block. However, before that is decided the counter which adds up the start points is reset in another step 4'. The counter which adds up the end points is also reset. However, the word length is increased by the length of the current block. In the event the maximum function DMAX is smaller than the threshold, thus the decision is yes, the counter which adds up the end points is increased by one in a fifth step 5. Another fifth decision element E5 determines if the current time of the nonspeech interval is longer than the number of counted end points, where the number of counted end points represents a time that has transpired during a nonspeech interval. In case of a negative decision, the above described fourth step 4 continues and the decision is made that a nonspeech interval is present in the block. In the event of a positive decision by the fifth decision element E5, it is determined that speech is present in the current block.

Starting with the second decision element E2 which determined if the preceding block was speech, in the event of a negative decision another decision is made by a sixth decision element E6. The sixth decision element E6 determines whether the maximum function DMAX is larger than a threshold. In the negative case, namely no, both the counter adding up the end points and the counter adding up the start points are reset in a sixth step 6. It is further determined that a nonspeech interval is present in this current block.

In the positive case, namely yes, the counter which counts the start points is increased by one in a seventh step 7. A subsequent seventh decision element E7 determines whether the time of the current word, namely of the speech, is greater than the number of counted start points. A positive result determines that a nonspeech interval is present.

In case of a negative result, the process continues with an eighth step 8, which corresponds to the fourth step 4 and resets all counters. The subsequent decision implies that speech is present in the current block.

In the following, special configurations of the invention are explained in detail.

With reference to the method according to the second aspect of the invention, it should be noted that the results of the distribution functions calculation must be highly accurate. Particularly when the values are small, high accuracy to several places behind the period must be provided. But to reduce this sensitivity, preferably a base 2 logarithm can be formed for the distribution functions.

A function according to:

$$\Delta LCD(i) = \log_2(\Delta CD(i)) \tag{39}$$

and a function according to:

$$\Delta LED(i) = \log_2(\Delta ED(m)) \tag{40}$$

are formed. It should be noted here that $\Delta LCD(i)$ and $\Delta LED$ are determined by an interval (0,31).

To determine whether speech or a nonspeech interval are present, a maximum function according to:

$$\Delta DMAX(i) = max \{\Delta LCD(i), \Delta LED(i)\} \tag{41}$$

is calculated. Then it is compared to a threshold, based on which a case difference is made. In the event that:

$$\Delta DMAX(i) < threshold, \text{ it follows}$$

that a nonspeech interval is present in the block. In the event that:

ΔDMAX(i)>threshold, it follows that speech is present in the block. In the event that:

ΔDMAX(i)=threshold, it follows that either speech or a nonspeech interval is present in the block, depending on what was detected in the block so far.

This case difference does not apply exclusively, in particular because there could be some indications for a contrary decision (see description in FIG. 2). It should be pointed out that the threshold remains constant and is independent of the loudness of the background noise. Accordingly, an adaptation to the method, according to the second aspect of the invention, is not required. This method is particularly suitable for speech recognition, e.g., in a moving vehicle, etc.

With regard to methods, according to the first aspect of the invention, it should be noted that a higher evaluation of one of the features of the feature vector could be advantageous, depending on the ambient noise. Additional smoothing mechanisms could also be used. Real time implementation applies to all of the above described methods.

We claim:

1. A method of detecting start and end points of words in a signal indicative of speech, with a detected start point indicating a beginning of a word and, at a same time, an end of a nonspeech interval, and a detected end point indicating an end of the word and, at a same time, a beginning of the nonspeech interval, comprising the steps of:

dividing the signal indicative of speech into blocks, forming a current feature vector from at least two current features, a first of which is a function of a signal energy, and an at least second of which is a function of a quadratic difference between a linear predictive coding (LPC) cepstrum coefficient of a current block and an average LPC cepstrum coefficient, determining an average feature vector from a predefined number I of blocks containing a nonspeech interval, and updating said average feature vector on an occurrence of each new nonspeech interval, and using the current feature vector and the average feature vector to determine a check quantity (U) which, compared with a threshold value, provides information as to whether a nonspeech interval or word is present, thus detecting the start and end points.

2. A method as claimed in claim 1 wherein the current feature vector (c(i)) is formed from at least two current features:

$$c(i) = \begin{bmatrix} ZCR(i) \\ BMW(i) \end{bmatrix},$$

a first of which, BMW(i), is a function of the signal energy:

$$BMW(i) = \frac{1}{L} \sum_{k=0}^{L-1} |x(k, i)|,$$

and the at least second of which is a function of the quadratic difference between the current LPC cepstrum coefficient and the average LPC cepstrum coefficient:

$$ZCR(i) = \sum_{n=0}^{K-1} |CEP(n, i) - CEP_{AVER}(n)|^2,$$

and wherein an average feature vector is calculated:

$$\hat{m}_p = \frac{1}{I} \sum_{i=0}^{I-1} c(i),$$

by means of which a covariance matrix is calculated which is used to determine the check quantity (U):

$$U = \frac{I*(I-N)}{N*(I^2-1)} |c_{(i)} - \hat{m}_p|^T * \hat{S}_p^{-1} * |c(i) - \hat{m}_p|,$$

which provides information as to whether a nonspeech interval or word is present.

3. A method as claimed in claim 1 wherein the check quantity (U) is determined by calculating a Mahalanobis distance.

4. A method as claimed in claim 1 wherein the at least second current feature is weighted differently from the first current feature.

5. A method as claimed in claim 1 wherein depending on an ambient noise level, smoothing mechanisms are used.

6. A method as claimed in claim 2 wherein the check quantity (U) is determined by calculating a Mahalanobis distance.

7. A method as claimed in claim 2 wherein the at least second current feature is weighted differently from the first current feature.

8. A method as claimed in claim 3 wherein the at least second current feature is weighted differently from the first current feature.

9. A method as claimed in claim 2 wherein depending on an ambient noise level, smoothing mechanisms and/or adaptive turn-on and turn-off thresholds are used.

10. A method as claimed in claim 3 wherein depending on an ambient noise level, smoothing mechanisms and/or adaptive turn-on and turn-off thresholds are used.

11. A method as claimed in claim 4 wherein depending on an ambient noise level, smoothing mechanisms and/or adaptive turn-on and turn-off thresholds are used.

12. A method of detecting start and end points of words in a signal indicative of speech, comprising the steps of:

dividing the signal indicative of speech into blocks, forming a current feature vector from at least two current features, a first of which is a function of signal energy, and an at least second of which is a function of a linear predictive coding (LPC) cepstrum coefficient, determining distribution functions by means of the functions of the current features, and determining for each block a maximum one of said distribution functions and comparing said maximum one of said distribution functions to a threshold as a measure of whether a nonspeech interval or word occurs between the detected start and end points.

13. A method as claimed in claim 12 wherein the first current feature is a function of the signal energy:

$$MV(i) = \frac{1}{L} \sum_{n=0}^{L-1} |PCM(i, n)|,$$

and wherein the at least second feature is a function of the LPC cepstrum coefficients:

$$CD(i) = \sum_{K=0}^{K-1} |CEP(k, i) - CEPs(k, i)|^2,$$

where CEPs(k, i) is a short-time average, and wherein distribution functions $$\Delta CD(i) = \frac{1}{N-1} \sum_{n=0}^{N-1} |CD(i-n) - CD_L(i)|^2$$

and $$\Delta MV(i) = \frac{1}{N-1} \sum_{n=0}^{N-1} |MV(i-n) - MV_L(i)|^2,$$

with $$CD_L(i) = \frac{1}{N} \sum_{n=0}^{N-1} CD(i-n)$$

$$MV_L(i) = \frac{1}{N} \sum_{n=0}^{N-1} MV(i-n),$$

are used to determine a maximum function DMAX(i)=max {ΔCD(i), ΔMV(i)} for said step of selecting a maximum one of said distribution functions.

14. A method as claimed in claim 13, wherein logarithmic distribution functions ΔLCD and ΔLMV given by ΔLCD(i) =log$_2$ (ΔCD(i)) and ΔLMV(i)=log$_2$ (ΔMV(i)) are used to determine said maximum function in order to determine whether a nonspeech interval or word is present.

15. Program module for detecting the start/end points of words in a signal indicative of speech, comprising:

input/output (I/O) means, responsive to the signal indicative of speech for providing said signal indicative of speech; and a signal processor, responsive to said signal indicative of speech from said I/O means, for forming a current feature vector for detecting both a start point and an end point, and for forming at least a second feature with noise-resistant properties for said feature vector in which the current feature vector, an average feature vector and a check quantity (U) are formed for detecting both said start point and said end point and for forming a start/end point signal wherein said I/O means is responsive to said start/end point signal for providing said start/end point signal as an output of said program module.

* * * * *